US009368244B2

(12) United States Patent
Woolley (10) Patent No.: US 9,368,244 B2
(45) Date of Patent: Jun. 14, 2016

(54) HYBRID MOLTEN SALT REACTOR WITH ENERGETIC NEUTRON SOURCE

(71) Applicant: Robert Daniel Woolley, Hillsborough, NJ (US)

(72) Inventor: Robert Daniel Woolley, Hillsborough, NJ (US)

( * ) Notice: Subject to any disclaimer, the term of this patent is extended or adjusted under 35 U.S.C. 154(b) by 353 days.

(21) Appl. No.: 14/259,734

(22) Filed: Apr. 23, 2014

(65) Prior Publication Data

US 2015/0078504 A1  Mar. 19, 2015

Related U.S. Application Data (60) Provisional application No. 61/878,584, filed on Sep. 16, 2013, provisional application No. 61/925,417, filed on Jan. 9, 2014.

(51) Int. Cl.
| | | |
|---|---|---|
| *G21B 1/01* | (2006.01) | |
| *G21G 1/00* | (2006.01) | |
| *G21C 1/14* | (2006.01) | |
| *G21C 1/30* | (2006.01) | |
| *G21D 1/00* | (2006.01) | |

(52) U.S. Cl.
CPC *G21G 1/001* (2013.01); *G21B 1/01* (2013.01); *G21C 1/14* (2013.01); *G21C 1/30* (2013.01); *G21D 1/00* (2013.01); *Y02E 30/40* (2013.01)

(58) Field of Classification Search
CPC ............... G21B 1/01; G21C 3/22; G21C 3/54
USPC ......... 376/146, 170, 171, 181, 182, 195, 317, 376/360
See application file for complete search history.

(56) References Cited

U.S. PATENT DOCUMENTS

| | | | |
|---|---|---|---|
| 3,527,669 A | 9/1970 | Bettis | |
| 4,663,110 A * | 5/1987 | Cheng | G21B 1/01 376/181 |
| 5,174,945 A | 12/1992 | Bussard et al. | |
| 5,182,075 A | 1/1993 | Gotoh et al. | |
| 5,774,514 A * | 6/1998 | Rubbia | G21C 1/30 376/171 |
| 6,233,298 B1 | 5/2001 | Bowman | |

(Continued)

OTHER PUBLICATIONS

Becker et al, "Feasibility of a critical molten salt reactor for waste transmutation", Progress in Nuclear Energy, 2008, vol. 50, pp. 236-241.*

(Continued)

*Primary Examiner* — Jack W Keith
*Assistant Examiner* — Daniel Wasil
(74) *Attorney, Agent, or Firm* — Hamilton, Brook, Smith & Reynolds, P.C.

(57) ABSTRACT

In an embodiment, a hybrid molten salt reactor includes a source of energetic neutrons, the energetic neutrons having a typical energy per neutron of 14 MeV or greater, a critical molten salt reactor, and a molten salt comprising a dissolved mixture of fissile actinides and fertile actinides. The molten salt circulates in a loop through the reactor vessel and around the source of energetic neutrons. The fissile actinides and fertile actinides sustain an exothermic nuclear reaction in which the actinides are irradiated by the energetic neutrons, the energetic neutrons inducing subcritical nuclear fission, and undergo critical nuclear fission when circulating through the critical molten salt reactor. A portion of the daughter neutrons generated by nuclear reactions are captured by the fertile actinides in the molten salt and induce transmutation of the fertile actinides into fissile actinides and sustain critical fission chain reactions in the molten salt reactor.

31 Claims, 1 Drawing Sheet

(56) References Cited

U.S. PATENT DOCUMENTS

| | | | |
|---|---|---|---|
| 8,279,994 B2 | 10/2012 | Kotschenreuther et al. | |
| 2007/0064859 A1* | 3/2007 | Bokov | G21C 1/30 376/194 |
| 2010/0063344 A1* | 3/2010 | Kotschenreuther | G21B 1/01 376/107 |
| 2011/0286563 A1 | 11/2011 | Moses et al. | |
| 2013/0083878 A1 | 4/2013 | Massie et al. | |

OTHER PUBLICATIONS

LaFuente et al, "Nuclear fission sustainability with subcritical reactors driven by external neutron sources", Annals of Nuclear Energy, 2011, vol. 38, pp. 910-915.*

Simonen et al, "A 14 MeV fusion neutron source for material and blanket development and fission fuel production", Nuclear Fusion, Apr. 29, 2013, vol. 53, pp. 1-5.*

Notification of Transmittal of the International Search Report and the Written Opinion of the International Searching Authority, or the Declaration in regards to International Application No. PCT/US2014/55435; Date of Mailing: Dec. 11, 2014.

European Organization for Nuclear Research (CERN). 1995. *Conceptual Design of a Fast Neutron Operated High Power Energy Amplifier*. By C. Rubbia, J.A. Rubio, S. Buono, F. Carminati, N. Fietier, J. Galvez, C. Geles, Y. Kadi, R. Klapisch, P. Mandrillon, J.P. Revol and Ch. Roche. Sep. 29. CERN/AT/95-44 (ET).

Plasma Physics Laboratory. 1975. *Beam-Driven Tokamak Fusion-Fission Hybrid Reactor*. By D.L. Jassby. March. MATT-1115.

Meade, Dale. 2010. 50 Years of Fusion Research. *Nuclear Fusion* 50: 014004.

Lawrence Livermore Laboratory. 1974. Advanced Concepts in Fusion-Fission Hybrid Reactors. By J.A. Maniscalco and L.L. Wood. Jul. 26. UCRL-75835.

Los Alamos Scientific Laboratory. 1980. The Fusion-Fission Hybrid as an Alternative to the Fast Breeder Reactor. By R.J. Barrett and R.W. Hardic. September. LA-8503-MS.

Moir, R.W. 1981. The Fusion-Fission Fuel Factory. In *Fusion: vol. 1 Magnetic Confinement Part B*, ed. Edward Teller, 411-451. New York: Academic Press, Inc.

Amherd, Noel A. 1982. A Summary of EPRI's Fusion-Fission Hybrid Evaluation Activities. Journal of Fusion Energy 2, Nos. 4/5: 369-373. (Journal Article).

Department of Energy. 2009. Research Needs for Fusion-Fission Hybrids: Report of the Research Needs Workshop (ReNew) Gaithersburg, Maryland, Sep. 30-Oct. 2, 2009.

Bettis, E.S., R.W. Schroeder, G.A. Christy, H.W. Savage, R.G. Affel, and L.F. Hemphill. 1957. The Aircraft Reactor Experiment—Design and Construction. Nuclear Science and Engineering 2: 804-825 (Journal Article).

Oak Ridge National Laboratory. 1965. MSRE Design and Operations Report, Part I, Description of Reactor Design. By R.C. Robertson. January ORNL-TM-728.

Oak Ridge National Laboratory. 1967. Chemical Research and Development for Molten-Salt Breeder Reactors. By W.R. Grimes. Jun. 6. ORNL-TM-1853.

Oak Ridge National Laboratory. 1971. Conceptual Design Study of a Single-Fluid Molten-Salt Reactor. Edited by Roy C. Robertson. June. ORNL-454.

Lidsky, L.M., "Fission-Fusion Symbiosis: General Considerations and a Specific Example", pp. 41-53, *Nuclear Fusion Reactors, Proceedings of the British Nuclear Energy Society Conference on Nuclear Fusion Reactors*, Sep. 17-19, 1969.

Lidsky, L.M., "Fission-Fusion Systems: Classification and Critique", *DCTR Fusion-Fission Energy Systems, ERDA*, Germantown, Maryland, Dec. 3 and 4, 1974.

Lidsky, L.M., "Fission-Fusion Systems: Hybrid, Symbiotic and Augean", pp. 151-173, Nuclear Fusion 15 (1975).

Lidsky, L. M., "Fusion-Fission Systematics", pp. 83-97, *Proceedings of the Second Fusion-Fission Energy Systems Review Meeting, U.S. Department of Energy*, Nov. 2 and 3, 1977, vol. I, Conf-771155.

Bethe, Hans A., "The Fusion Hybrid", *Physics Today*, May, 1979.

Bethe, Hans A., "The Fusion Hybrid Reactor", *Sandia National Laboratories*, Aug. 1981.

Mueller, William M., et al., "Metal Hydrides", pp. 21-50, *Academic Press*, 1968.

Schaeffer, N.M., "Reactor Shielding for Nuclear Engineers", pp. 443-462, *U.S. Atomic Energy Commission*, May, 1973.

Wyrick, Steven, et al, "NNSA Tritium Supply Chain", *U.S. Department of Energy, INMM Annual Meeting Conference*, Published Aug. 21, 2013.

Woolley, Robert D., "System Studies of Fission-Fusion Hybrid Molten Salt Reactors", PhD diss., *University of Tennessee*, Dec. 2013.

* cited by examiner

HYBRID MOLTEN SALT REACTOR WITH ENERGETIC NEUTRON SOURCE

RELATED APPLICATIONS

This application claims the benefit of U.S. Provisional Application No. 61/878,584, filed on Sep. 16, 2013 and U.S. Provisional Application No. 61/925,417, filed on Jan. 9, 2014. The entire teachings of the above applications are incorporated herein by reference.

BACKGROUND

There are 15 actinide elements, each with several important isotopes. All actinide isotopes are unstable to radioactive decay involving emission of alpha or beta particles along with gamma rays, as also are all isotopes of the next five atomic numbers below the actinides. Instability and ease of fission of at least some actinide isotopes generally increases with ascending atomic number and spontaneous fission also becomes common in the higher actinides.

All actinide atoms are fissionable, meaning each can be fissioned if its atomic nucleus is struck by a sufficiently energetic neutron. Actinide isotopes can be classified according to whether they are fissile, meaning that they can be fissioned by slow neutrons having room-temperature thermal motion energies of about 0.025 eV. Examples of fissile actinide isotopes include uranium-233, uranium-235, plutonium-239 and plutonium-241, but of these only uranium-235 is found in nature. Only the fissile actinide isotopes can support fission chain reactions, since emitted fission daughter neutrons having enough energy to fission other non-fissile actinides are rare.

Uranium-235 with a 704 million year half-life is the only naturally occurring fissile isotope. Uranium-238, which has a 4.47 billion year half-life is 138 times more abundant and thorium-232, with a 14.05 billion year half-life, is about 500 times more abundant. Both can be fissioned, releasing about 200 MeV of energy per atom. However, they are only fissionable, not fissile. A sustained fission chain reaction is impossible with either of these more plentiful isotopes.

Isotopic enrichment is a difficult industrial process in which a mixture of two or more isotopes of an element is divided into two different mixtures, an "enriched" mixture with an increased concentration of one isotope and a "depleted" mixture with a depressed concentration of the same isotope.

Light water reactors (LWRs), the reactor design currently responsible for producing the majority of the world's nuclear power, rely on the rare uranium-235 isotope as fuel, leaving most of the uranium-238 isotope unused along with the thorium-232 isotope which LWRs entirely ignore. Indeed, the total utilization of mined uranium is only about 1%, with 99% discarded as depleted uranium or as the main component of spent nuclear fuel (SNF). Two alternative physics pathways exist to make use of the two naturally abundant actinide isotopes, uranium-238 and thorium-232, as follows:

Pathway one: Provide a source of sufficiently energetic neutrons to induce fissions without a chain reaction.

Pathway two: Transmute the fissionable isotopes into fissile isotopes, then fission them in a chain reaction.

Initially, there was no known source of fast neutrons with enough generation efficiency to cause net energy release from the first pathway. That changed when the first H-bomb was tested, but for non-explosive applications it remained true that no energy-efficient source of fast neutrons was available.

Isotopes able to be transmuted into fissile isotopes by absorbing a neutron, followed in some cases by beta decay processes, are known as fertile isotopes. All non-fissile actinides are fertile in this sense. Thus, the second pathway for the two fertile and fissionable, but not fissile, natural actinide isotopes is based on the following chained nuclear reaction sequences:

Plutonium-239 and uranium-233 support fission chain reactions as well as natural uranium-235 does.

Every critical nuclear fission reactor incorporating either some uranium-238 or some thorium-232 causes these fissile fuel production reactions to occur. The ratio of the rate of production of new fissile atoms divided by the rate of fissioning fissile atoms is an important reactor parameter termed the Conversion Ratio (CR) if less than unity or the Breeding Ratio (BR) if greater than unity. Typical CR values are 0.6 for LWRs and can exceed 0.9 for a molten salt reactor (MSR) with a graphite moderator. Reaching or exceeding unity would imply converting all fertile atoms into fissile atoms then fissioning them. To exceed unity using uranium-238, it is necessary to use fissile fuel with high plutonium-239 content, minimize neutron captures in structural material, surround the core with an optimized uranium-238 blanket, and frequently recycle the fuel and blanket through a reprocessing center in order to chemically extract bred plutonium from the blanket and insert it into the core while also removing neutron-absorbing fission products.

Experimental Breeder Reactor 1 (EBR-1), the world's first liquid metal cooled fast breeder reactor (LMFBR) began operation in December 1951, producing 200 kW of electricity from its 1.4 MW thermal power. By 1953 it had demonstrated a net breeding gain, thus confirming the conceptual design of a fuel breeder using plutonium fuel with a non-moderating coolant. Much larger LMFBR designs for electricity production are highly constrained but have been built and operated in several countries, all exhibiting BR values slightly exceeding one. In principle such fission breeders could consume most of their actinide feedstock input streams. However, they have not been widely deployed, partly because breeders have higher costs than LWRs both for initial capital outlays and ongoing plutonium fuel recycling, but also due to fears about breeder reactor safety and special breeder concerns about terrorism and weapons proliferation.

Ever since the aforementioned fission breeder design difficulties, costs, and constraints were recognized, there have been efforts to find alternative approaches to harvesting fission energy from the more abundant non-fissile but fissionable actinides. Other than the breeder reactor, the only non-fusion approach ever suggested was Carlo Rubbia's 1995 "Energy Amplifier" which relied on spallation. In nuclear spallation, a beam of very high energy ions emerging from a particle accelerator, typically hydrogen ions with energies between 800 MeV and 7,000 MeV per proton, is focused on a heavy metal target, typically of mercury, lead, or tantalum.

Each spallation impact of a very high energy proton on a heavy metal nucleus then sprays out typically 20 to 30 high energy neutrons. However, some protons may fail to cause spallation so the efficiency may not be high. In the Energy Amplifier scheme, high energy spallation neutrons would then cause fissions in thorium-232 or uranium-238 via pathway one, thus releasing even more neutrons which in turn would be absorbed causing pathway two transmutation chains ending in uranium-233 or plutonium-239. A concern about this method is whether the very high energy investment needed per spallation neutron could be offset by the energy content of the fissile fuel produced. Another concern is the high cost and large size of present particle accelerators.

Unlike accelerator driven systems, use of a fusion neutron source may be less of a concern since fusion releases its own nuclear energy. Fusion schemes can be classified according to whether their fusion fuel feeds are deuterium only (DD) or deuterium tritium (DT). If the neutron source is a fusion system using a feedstock of deuterium only, then half of its resulting DD fusion reactions would produce 2.45 MeV neutrons. These do not carry enough energy for pathway one but are adequate for pathway two. If instead a fusion neutron source uses a 50/50 DT feedstock of deuterium and tritium then almost all neutrons produced would be 14.1 MeV neutrons adequate for pathway one. Furthermore, for identical fusion plasma temperature and pressure conditions, the neutron flux will be two orders of magnitude more intense than in the DD fuel case.

While it was recognized in the 1950s that neutron bombardment of fissionable actinide isotopes could greatly expand fissile fuel supplies, there were no controlled fusion neutron sources with adequate energy efficiency. Particle accelerators can easily produce fusion reactions but coulomb scattering is so strong that their typical efficiencies are only about 0.001%. After some initial analyses the subject of hybrid systems was not pursued further. This changed in 1969 when Soviet researchers announced their tokamak device had confined a plasma with temperatures approaching the thermonuclear fusion range. After an international team confirmed the temperatures, other researchers around the world built their own tokamaks and began experiments with fusion-relevant plasmas.

A fusion concept developed in the mid-1970s envisioned a non-Maxwellian ion velocity distribution plasma known as the Two Component Tokamak (TCT). This TCT scheme using neutral beams was the basis for the Tokamak Fusion Test Reactor (TFTR) at the Princeton Plasma Physics Laboratory (PPPL). TFTR performance culminated in a plasma fusion energy gain (Q), i.e., fusion power divided by plasma heating power, of about Q=0.28. Neutral beams were subsequently used at the Joint European Torus (JET) near Oxford in the U.K. to achieve a higher fusion energy gain factor of about Q=0.65. Although these energy gain results are still far too low for pure fusion energy systems, the TCT approach is attractive for Fission Fusion Hybrid (FFH) schemes where the large energy multiplication ratio of the resulting fissions can underwrite the continuous investment of power fed back to a neutral beam plasma heating system. Today it remains the most plausible scheme for producing via fusion the 14.1 MeV neutrons needed for a hybrid nuclear reactor.

A 1974 Lawrence Livermore Laboratory paper reported the results of neutronics simulations of various FFH blanket options using solid materials, including the graded use of various moderators. It predicted an optimized fission blanket power about ten times the DT fusion power with tritium breeding self-sufficiency in the blanket and also a net blanket production of plutonium-239 ranging, for different blanket options, from 2.24 to 4.51 atoms per DT fusion neutron. The report concluded that FFH technology could eliminate the need for isotopic enrichment and could use the then-existing national stockpile of depleted uranium for fuel, thus producing from this source alone a thousand years of electrical power for the US.

This and subsequent published FFH studies envisioned a stand-alone fissile fuel factory which would produce and export plutonium for use in solid fuel rods to be fabricated for and fissioned in other reactors. In proposed FFH systems, fissions only occur in a subcritical fission blanket. In a recent (2009) Gaithersburg, Md. workshop organized by the Department of Energy titled "Research Needs for Fusion-Fission Hybrid Systems," that limitation was elevated to become a definition: "A fusion-fission hybrid is defined as a subcritical nuclear reactor consisting of a fusion core surrounded by a fission blanket. The fusion core provides an independent source of neutrons, which allows the fission blanket to operate subcritically."

SUMMARY

Disclosed herein are embodiments of a hybrid molten salt reactor advantageously incorporating a critical molten salt reactor with a source of energetic neutrons surrounded by a molten salt blanket in which fissions occur.

Embodiments of the hybrid molten salt reactor (HMSR) may fission any combination of supplied actinides within a self-contained reactor system. Some embodiments can efficiently produce electrical power without requiring fuel enrichment, solid fuel fabrication, or spent fuel reprocessing and recycling, thus eliminating any need to transport concentrated fissile material. In some embodiments, where fission product inventories in the molten salt are limited to suitably low levels, actinides are entirely fissioned within the HMSR, thus fully exploiting the energy potentially available from actinides and removing them from the radioactive waste stream. In addition, certain long-lived fission products can be transmuted to shorter-lived isotopes within the HMSR without isotopic separation by simply not removing those chemical elements, while the quantity of others can be diminished by removing their chemical elements at optimized rates.

In an example embodiment a hybrid molten salt reactor comprises a source of energetic neutrons, the energetic neutrons having a typical energy per neutron of 14 MeV or greater, a critical molten salt reactor comprising a reactor vessel, a loop comprising a path in the reactor vessel and around the source of energetic neutrons, and a molten salt, the molten salt containing a mixture of fissile actinides and fertile actinides, the molten salt circulating in the loop. The circulating molten salt has a sustained exothermic nuclear reaction comprising: (i) the fissile and fertile actinides irradiated by the energetic neutrons when exposed to the source of energetic neutrons, the energetic neutrons inducing subcritical nuclear fission and generating daughter neutrons, (ii) the fissile actinides in the circulating molten salt undergoing critical nuclear fission when circulating through the vessel of the critical molten salt reactor and generating daughter neutrons, and (iii) a portion of the fertile actinides capturing a portion of the daughter neutrons and, the captured daughter neutrons inducing transmutation of the portion of fertile actinides into fissile actinides.

In some embodiments, the hybrid molten salt reactor further includes a blanket of tanks surrounding the source of energetic neutrons, with the molten salt circulating through the blanket of tanks, and a thickness and an arrangement of the blanket of tanks enabling an adequate fraction of the energetic neutrons to be absorbed in the molten salt to maintain a sufficient inventory of fissile actinides in the molten salt to maintain criticality of the critical molten salt reactor. The thickness and arrangement of the blanket of tanks enables the molten salt to absorb a sufficient portion of the energetic neutrons and generated daughter neutrons to maintain a desired fissile inventory. The blanket of tanks can be chemically and mechanically compatible with the molten salt, with each tank having separate plumbing connections for liquid inflow and outflow. The separate plumbing connections enable draining the tank based on gravity. The blanket of tanks can further include mechanical supports and plumbing connections configured for rapid replacement using remote handling equipment.

The hybrid molten salt reactor can further include a controller adjusting an average power level of the source of energetic neutrons to maintain fission criticality in the critical molten salt reactor. The fission induced by the energetic neutrons and absorption of the resulting fission daughter neutrons by fertile actinides maintains fissile actinides in the molten salt at a concentration necessary for fission criticality in the molten salt reactor. The critical molten salt reactor can further include neutron absorbing control rods adapted to be partially inserted into the molten salt reactor in order to reduce a stable operating temperature of the molten salt reactor and adapted to be fully inserted into the molten salt to completely halt and preclude fission chain reactions.

The hybrid molten salt reactor may include a fission product removal system enabling removal of one or more fission products from the molten salt.

In some embodiments, the hybrid molten salt reactor includes a fuel system adding actinide salts to the molten salt at a rate which compensates for the loss by fission of the actinides previously dissolved in the molten salt. The fuel system can enable continuous fueling of the HMSR without stopping the critical nuclear fission chain reactions in the critical molten salt reactor. The hybrid molten salt reactor may include a fission product removal system enabling removal of one or more fission products from the molten salt, wherein the fission product removal system removes the fission products at a rate enabling indefinitely maintained fission in the critical molten salt reactor. In some embodiments, actinide fueling and fission product removal is sufficient to enable 100% fission energy utilization of the fertile actinides.

The hybrid molten salt reactor may include a pump system to pump the molten salt around the source of energetic neutrons and through the vessel of the critical molten salt reactor.

The hybrid molten salt reactor may include a heat exchanger receiving heat produced by the HMSR, wherein the pump system pumps the molten salt through the heat exchanger.

The critical molten salt reactor may include a moderator. The moderator can be lithium hydride using the deuterium isotope of hydrogen and using lithium enriched in the lithium-7 isotope. The moderator can be a graphite core.

The molten salt can contain lithium fluoride enriched in the lithium-7 isotope and sodium fluoride.

The molten salt can contain fertile thorium-232 and the daughter neutrons transmute the fertile thorium-232 into fissile uranium-233. The molten salt can contain fertile uranium-238 and the daughter neutrons transmute the fertile uranium-238 into fissile plutonium-239. For either natural isotope, neutron absorption with gamma ray emission immediately transmutes the original nuclide to a far less stable isotope of the same element. Such neutron captures are most common with low energy incident neutrons but also occur with neutrons of higher energy. Uranium-239, produced by neutron absorption in natural uranium-238, then beta-decays with a 23.5 minute half-life into non-fissile neptunium-239, which in turn beta-decays with a 2.36 day half-life into the fissile plutonium-239 isotope, whose half-life is 24,100 years. Similarly, thorium-233, produced by neutron absorption in natural thorium-232, beta-decays with a 22.3 minute half-life into the non-fissile protoactinium-233 isotope, which in turn beta-decays with a 27.0 day half-life into the fissile uranium-233 isotope, whose half-life is 159,200 years.

The source of energetic neutrons can be a nuclear fusion device producing the energetic neutrons from the fusion of hydrogen isotopes.

The source of energetic neutrons can be a spallation device producing the energetic neutrons by impacting energetic ions on a target material.

The molten salt can contain fertile thorium-232 and neutrons either produced as fission daughters or resulting from (n,2n) and/or (n,3n) reactions transmute it into fissile uranium-233 which then fissions.

The molten salt can contain a mixture of one or more actinides either from spent nuclear fuel wastes of nuclear fission reactors or from any other source, wherein absorption of neutrons either produced as fission daughters or resulting from (n,2n) and/or (n,3n) reactions converts fertile actinides into fissile actinides which then fission.

The molten salt can contain natural mined uranium that has not been isotopically enriched, the natural mined uranium containing fertile uranium-238 and fissile uranium-235, the fission daughter neutrons transmuting the fertile uranium-238 into fissile plutonium-239 and the fissile plutonium-239 undergoing fission with the uranium-235.

The molten salt can contain fertile uranium-238 or depleted uranium which by definition is primarily uranium-238 and neutrons either produced as fission daughters or resulting from (n,2n) and/or (n,3n) reactions transmute it into fissile plutonium-239 which then fissions.

Another example embodiment of the HMSR combines a critical Molten Salt Reactor (MSR) with an external source of high energy neutrons by routing the molten salt which flows in a loop through the MSR's reactor core, through the MSR's external heat exchanger and circulating pump, to also flow through a blanket of tanks adjacent to the external neutron source, before returning in the single loop to the MSR's core. The adjacent blanket of tanks surrounds enough of the external neutron source so that most neutrons from the external neutron source enter the tanks and are absorbed by actinides carried by molten salt flowing through those tanks. The embodiment of the HMSR also includes a control scheme which adjusts the power level of the external source of high energy neutrons so as to maintain fissile actinides in the molten salt at concentrations which provide the MSR's necessary reactivity. An embodiment, in which MSR power is separately controlled to follow variations in the aggregate total external load demand for electric power, adjusts the time-averaged high energy neutron source power to be a fraction of the MSR power where that fraction is itself continuously increased or decreased based on comparison of measurements of MSR reactivity with a fixed reactivity setpoint.

Past hybrid reactor design concepts have not in general included a critical reactor. In particular, they have not included critical molten salt reactors such that dissolved nuclear fuels would flow internally around a single shared loop including both the critical molten salt reactor and a separate zone for irradiation by high energy neutrons.

The high energy neutron source may either be a nuclear fusion reactor device producing 14.1 MeV neutrons from the fusion of hydrogen isotopes, or it may be an accelerator-driven spallation device producing neutrons of that or even higher energies.

DETAILED DESCRIPTION

The molten salt reactor (MSR) is a design in which the fuel is liquid and mobile. MSR designs employ liquid salt mixtures including dissolved fissile fuel nuclides and frequently also fertile nuclides such as thorium-232 or uranium-238. The fractions of different mixture components are usually chosen near eutectic points of phase diagrams so that the mixture's melting point, which typically is well above room temperature, is minimized and so that any unexpected salt freeze-up event would produce uniform solidification without separating into dissimilar mixture components. Since fluorine is the strongest possible oxidizer for chemically binding metals, most MSR designs have adopted fluorine-based molten salts such as $UF_4$, $PuF_3$ and $ThF_4$ dissolved in a carrier liquid mixture of NaF, $ZrF_4$, LiF and/or $BeF_2$. Other proposed MSR designs used chloride-based carrier salts (e.g., NaCl) mixed with uranium chloride and plutonium chloride in order to achieve a harder fission neutron energy spectrum and somewhat lower melting temperatures.

Historically, the first MSR built and operated was the Aircraft Reactor Experiment (ARE) which operated at Oak Ridge National Laboratory (ORNL) in 1954 (without ever flying). Later, the 8 MW Molten Salt Reactor Experiment (MSRE) at ORNL operated more than 17,000 hours from 1965 through 1969, testing fission power operations with molten salt mixtures employing successively uranium-235, uranium-233, and then trace plutonium-239 as fissile fuel components. A detailed design of a thorium to uranium-233 breeder reactor employing the MSR concept, the Molten Salt Breeder Reactor (MSBR), was completed at ORNL in the early 1970s but never built. However, since the 1970s, engineering interest in the MSR has continued. The MSR class of designs has been adopted internationally as one of the Generation IV reactor design families chosen in the past decade to be developed for possible future use, and there is substantial technical research interest in MSR's within the international nuclear engineering community.

The initial attraction of using molten fuel was its very strong negative temperature coefficient that results when thermal expansion causes liquid fuel to leave a moderated reactor core region. This can result in reactor power adjusting itself naturally to follow load demand variations without active feedback control, and it also is a safety feature. The most striking characteristic of MSRs is that their nuclear fuels are liquid and thus can be made to flow. This confers several advantages as follows:

(i) A strongly negative temperature coefficient enhances stability and safety.

(ii) Fuel can be moved by gravity from the reactor core to passively cooled dump tanks in an emergency. One simple design passively initiates a dump if a solidified salt plug melts.

(iii) No solid fuel needs to be fabricated.

(iv) Fission products can be continuously removed and make-up fuel added while operating.

(v) A low radioactivity source term for accidental releases can be achieved by the continuous removal of fission products from the molten salt, thus maintaining a low fission product inventory in the MSR.

(vi) Low reactivity margins for criticality optimized designs are feasible, thus reducing the extent of worst-case possible criticality excursions.

(vii) External cooling becomes possible because of fuel flow. Heat can be removed in external heat exchangers located outside the critical core region, and thus away from where the fission chain reaction occurs, instead of using space within the reactor core for heat transfer to a coolant as is required for all solid fuel designs. This allows a more compact fission core design in a MSR.

(viii) Delicate solid fission fuel and cladding structures vulnerable to meltdown damage in light water reactors (LWRs) are entirely eliminated.

(ix) Life-limiting damage to solid fuel caused by fissions which increase the number of atoms and their volume in the solid is eliminated since ionic liquids have no molecular or crystalline structure to damage.

These attributes are thought to simplify the safety situation for a MSR design. Indeed, MSRs are not subject to core meltdown accidents since, tautologically, their fuel is already melted during normal operation. MSR salts are chemically stable so they cannot burn or explode. Furthermore, an MSR thermal conversion cycle using helium in a closed Brayton cycle instead of water/steam would also avoid any steam explosion hazard.

Figure 1:
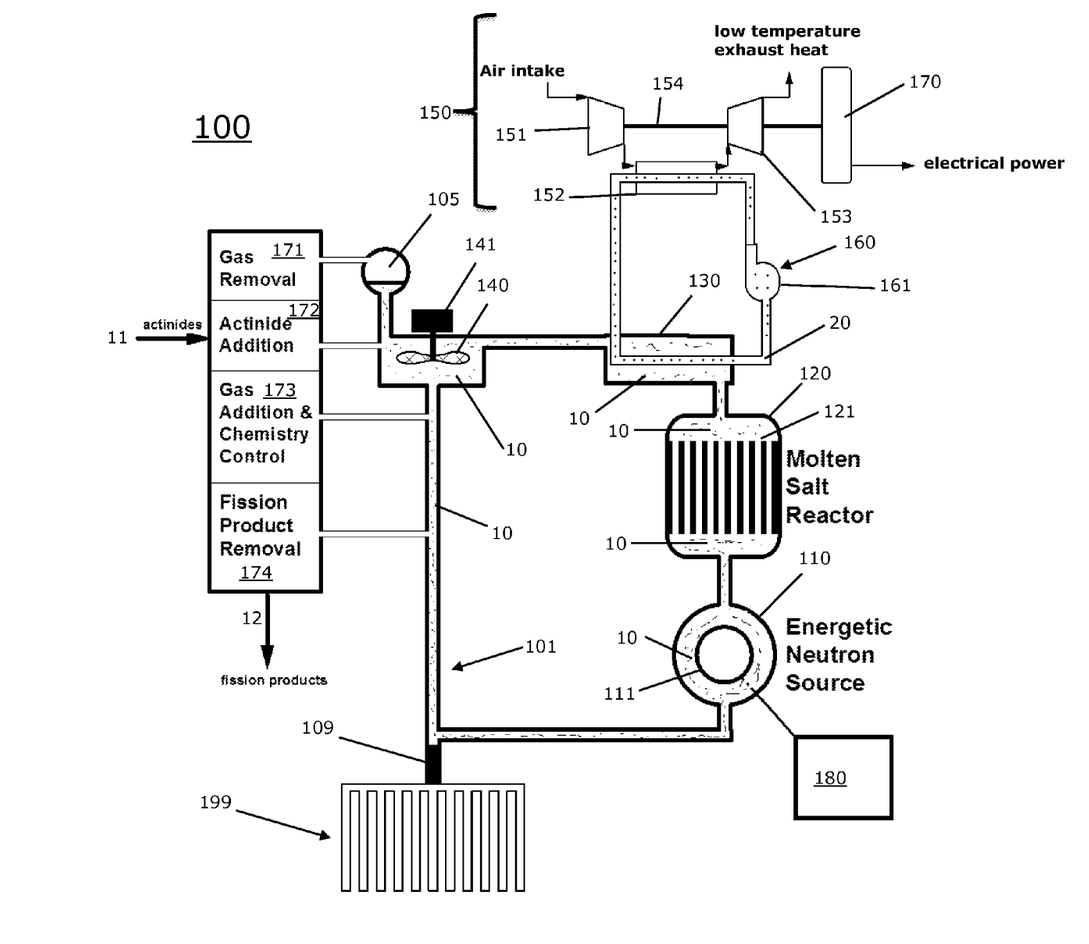
FIG. 1 is a block diagram of an example embodiment of a hybrid molten salt reactor.

FIG. 1 illustrates a schematic system diagram of an embodiment of a hybrid molten salt reactor. This depicted embodiment is intended for use in a stationary location since gravity affects some of its features. FIG. 1 shows a single closed loop of pipes 101 connecting the following four components: a blanket of tanks 110, which surrounds an energetic neutron source 111 adjacent to but not part of the loop 101, a molten salt reactor 120, a molten salt heat exchanger 130, and a molten salt circulating pump 140. The loop of interconnecting pipes 101 and associated components 110, 120, 130, 140 is oriented with respect to the vertical direction so that the molten salt heat exchanger 130 is located at the highest elevation in the loop 101 and, in particular, is located above the molten salt reactor 120 to which it is directly connected. An additional pipe not part of the loop 101 extends upward from the highest elevation in the loop 101 to a closed pressurizer volume 105 located above the loop. Another additional pipe not part of the loop extends downward from the lowest elevation in the loop 101, through a salt freeze plug 109 to a set of dump tanks 199 located below the loop 101. The total aggregate volume of the dump tanks 199 equals or exceeds the closed volume for molten salt 10 above the dump tanks 199.

A molten salt liquid mixture 10 of different ionic salt components including actinides fills the entire loop 101 and extends upwards above the loop into the lower part of a closed pressurizer volume 105 which serves to accommodate expansion and contraction of the molten salt 10, e.g., as a result of molten salt 10 temperature changes over time. Gas in contact with the molten salt fills the upper part of the pressurizer volume 105. The molten salt mixture 10 also extends downwards to the salt freeze plug 109 location where deliberate external heat leakage mechanisms, not shown in FIG. 1, cause the salt temperature to stay below the salt's freezing/melting temperature, thus plugging the downward path within the piping 101 by solid salt 109 so that during normal operation molten salt 10 stays in the loop 101 and does not drain into the dump tanks 199. Also not shown is the system to restore the salt freeze plug 109 and molten salt 10 from the dump tanks 199 back to the main loop 101 in order to resume normal operation.

A particular embodiment of the HMSR based on fluorides which is compatible with FIG. 1 is the eutectic mixture of about 44.5 mole % LiF, 24.1 mole % NaF, and 31.4 mole % of the fluorides of actinides such as $ThF_4$ or $UF_4$. Such mixtures are liquid between approximately 490° C. to well above 1000° C. and so could be used with loop temperatures in the 600° C. to 700° C. range. Each actinide can assume multiple chemical combinations with fluorine, e.g., uranium can form $UF_3$, $UF_4$, and $UF_6$. To control their relative abundances in the molten salt a redox chemistry gas control system 173 of FIG. 1 can be configured injecting gases at a low point into the molten salt, letting their bubbles ascend due to their buoyancy, and withdrawing them from the pressurizer volume. For instance, bubbling fluorine gas through the molten salt based on fluorides decreases the concentration of $UF_3$, while increasing concentrations of $UF_4$ and $UF_6$, while bubbling hydrogen gas through the molten salt thus forming HF gas in the pressurizer decreases the $UF_6$ concentration while increasing concentrations of $UF_3$ and $UF_4$.

Continuing to refer to FIG. 1, with a molten salt 10 mixture of fluorides, fresh actinide fuels 11 can be most conveniently added to the loop 101 as fluorides with an actinide addition system 172. Much of the existing stockpile of depleted uranium is at present stored as $UF_6$ and natural uranium is typically converted to $UF_6$ gas before being enriched. However, since fluorine is the strongest oxidizer it is not difficult to prepare actinide fluorides from any other chemical form. If spent nuclear fuel from LWRs, which is mostly $UO_2$, is pulverized then heated in a fluorine atmosphere, it burns to form uranium fluoride compounds while releasing oxygen.

Gaseous fission products such as xenon tend to eventually rise to and collect within the pressurizer's gas volume 105 to be processed by a gas removal system 171, but this process can be greatly accelerated by sparging. In the sparging process, a gas, preferably helium, is injected at a low point into the molten salt and its many bubbles rise up to the pressurizer gas volume from which they are continuously removed. The large surface area of gas bubbles rising through the molten salt 101 increases the rate at which fission product gas atoms are combined into bubbles which are rapidly removed from the molten salt due to their buoyancy.

Some fission products 12 such as the noble metals do not form soluble fluorides and may be processed by a fission product removal system 174, which may mechanically remove from a secondary loop by filtration or centrifugal separation. Others may be removed from a secondary loop by distillation. Electrochemical means provide ways to remove still other fission products from the molten salt.

An alternative embodiment of the HMSR system using chloride salts is possible and can provide a salt mixture with chemical bonds almost as strong as with fluorine but having a lower melting/freezing temperature than fluorides. However, it would not then be possible for the HMSR to avoid transmuting both natural chlorine-35 and natural chlorine-37 into radioactive chlorine-36, which has a half-life of 301,000 years. Alternative embodiments based on bromide or iodide salts are also possible and would also result in lower melting/freezing temperatures without producing any long half-life radioactive product but would have somewhat weaker chemical bonds than fluorine or chlorine and would need to contend with the complicating fact that both bromine and iodine are also fission products themselves. Neither fluorine nor chlorine is a fission product.

During normal operation of the HMSR system the loop's 101 molten salt 10 is in steady rapid motion, circulating around the loop 101 because of the pumping action of the molten salt circulating pump 140 which itself is driven by an electric motor 141. Molten salt pumps 140 successfully used in the past have been of the vertical shaft type. Molten salt 10 pumped to elevated pressure exits the molten salt pump 140 in the downward direction, flowing through piping 101 until reaching the blanket tanks 110 which surround the energetic neutron source 111, flowing through the blanket tanks 110 and then on through piping 101 to enter the lower plenum of the molten salt reactor 120, then flowing upwards through the reactor core's 121 multiple parallel spaced channels in a moderator, which in the FIG. 1 depicted embodiment is a graphite moderator, then through an upper molten salt reactor 120 plenum and then loop piping 101, to and through the molten salt heat exchanger 130, then at lower pressure back through piping 101 to the molten salt circulating pump's 140 intake, thus completing the loop.

During normal operation, a steady neutron flux maintains itself by critical fission chain reaction mechanisms in the molten salt reactor's 120 core region 121, causing fissions of fissile atoms to occur while the molten salt 10 containing those fissioning atoms within the liquid is flowing through the reactor core's 121 multiple spaced channels through the moderator. Most fissions occur in this spatial core region 121 because the moderator material filling the spaces between flow channels scatters and thereby slows fission daughter neutrons passing through it from their initial fission spectrum energies typically near 1 MeV per neutron to lower energies approaching the thermal range, e.g., 0.025 eV to 1 eV. The physics of fission includes the fact that for fissile atoms the fission cross sections which together with neutron flux determine fission rates are greatly increased if the initiating incident neutrons have low energy.

These fissions occurring in the molten salt 10 as it flows through the molten salt reactor 120 directly heat the molten salt 101 liquid volumetrically without requiring any heat transfer through surfaces. Thus, molten salt reactor power density is not restricted by fuel-to-coolant heat transfer limits of the reactor core's 121 design, as is the case for all solid fueled fission reactors. Molten salt 10 exits the top of the molten salt reactor 120 at a higher temperature than its temperature when it entered at the reactor's bottom, because of the heat immediately released by fissions in the core 121.

Most types of fission daughter atoms have a ratio of neutrons to protons in their nuclei too large for stability, so they are temporarily radioactive, typically emitting beta electrons and gamma rays with half-lives ranging from fractions of a second to much longer. During normal steady fission operations these decay processes contribute about 7% of total power, and they also cause direct volumetric heating of the molten salt distributed around the entire molten salt loop.

The molten salt heat exchanger 130 contains two flowing fluids, the molten salt 10 and an intermediate heat transfer fluid 20, not containing any actinides, in a secondary loop 1602. There are multiple possible intermediate heat transfer fluids 20 possible, each compatible with the embodiment depiction of FIG. 1. The heat exchanger 130 keeps the two fluids 10, 20 separated from each other by a compatible solid membrane through which heat flows via thermal conduction from the molten salt 10 on the higher temperature side of the membrane to the intermediate fluid 20 on the lower temperature side. This heat exchanger 130 thus serves to export the high temperature heat produced in the reactor 121 without exporting radioactivity. Heat exchanger technology is a well-known art, and standard heat exchanger parameters determine relationships between flow rates of the two fluids, their incoming and outgoing temperatures, their heat transfer rates, and their flow pressure drops. By adopting a counterflow scheme and increasing the membrane's total surface area, completely efficient heat transfer can be approached arbitrarily closely, albeit with increasing heat exchanger cost.

Alternatives to the FIG. 1 embodiment may optionally include more than one intermediate heat transfer 20 fluid with high temperature heat transferred from the molten salt 10 to the first fluid, then through another heat exchanger (not shown) to the second fluid, etc., before exporting the high temperature heat for external uses such as electric power production. Although such features would increase HMSR cost they would decrease the chance of releasing radioactivity because of a physical failure of a single heat exchanger membrane.

Continuing to refer to FIG. 1, the high temperature heat transferred through the molten salt heat exchanger 130 to the intermediate heat transfer 20 fluid is further transferred to a thermal conversion system 150 which converts its energy content into a combination of mechanical work in the form of rotating shaft torque and low temperature heat. The mechanical work in turn operates a generator 170 producing electrical power while the low temperature heat is exhausted into an adjacent external heat sink, either the atmosphere or a very large body of water, from which in either case the low temperature heat ultimately radiates to space.

Different conventional thermal conversion schemes are possible, each having its own advantages. The particular scheme depicted in the FIG. 1 embodiment is an open Brayton cycle in which air is first compressed by a compressor 151, then heated by a second heat exchanger 152 transferring to the air high temperature heat from the intermediate heat transfer fluid 20, then is expanded through a turbine 153 mounted on the same rotating shaft 154 as the compressor 151, and finally is exhausted back to the atmosphere at a low temperature which is warmer than the air intake temperature, thus carrying away the low temperature exhaust heat into the atmosphere without requiring any low temperature heat exchanger equipment to transfer heat into the air. Turbine torque exceeds compressor torque, providing the net mechanical power used to operate the electrical generator 160 which is also mounted on the same shaft 154. Although the depicted open Brayton cycle has the advantage of low capital cost, other conversion schemes such as closed Brayton cycles and Rankine cycles can obtain higher thermal conversion efficiencies. Thus, as with the design selection of heat exchanger parameters, cost-benefit trade-off studies should guide the selection of the thermal conversion system from the range of conventional options.

Normal operation of any molten salt reactor 120 includes an inherently stable load-following characteristic. If thermal conversion power increases to satisfy a suddenly increased electrical demand, suddenly exceeding the rate at which heat is being transferred into the intermediate heat transfer fluid 20 from the molten salt 10, then the average temperature of the entire intermediate loop 160 will lower as more heat is withdrawn from it than is being added. The reduction in temperature of the intermediate loop 160 will in turn cause an increased cooling of the molten salt loop 101, causing its temperature to also decrease as long as fission power remains constant. However, the reduced molten salt 10 temperature causes reactivity to increase via two mechanisms. Reduction of effective resonance cross sections because of the Doppler coefficient increases the fraction of neutrons, which avoid capture and reach low energy where they are effective in causing fissions. Thermal contraction of the molten salt 10 as its temperature is reduced removes some molten salt from the pressurizer's expansion volume 105 and increases the density of molten salt 10 in the molten salt reactor's 120 core region 121 and thereby the amount of fissile material there. The reactivity increase from both effects causes reactor power to increase at a slow exponential rate set by the net positive reactivity and the delayed neutron fraction of the fuel mixture. Reactor power then increases until the net reactivity returns to zero, which does not occur until the average molten salt 10 temperature in the reactor 120 returns to the same temperature that prevailed before the electrical load demand increase. At that time, the reactor power will be at a higher value than before, balancing the increased load demand. A similar sequence for decreases in load demand illustrates this load following behavior, with increases in the temperature of the intermediate fluid 20 and the molten salt 10, increases in resonant absorption of neutrons and decreases in the fissile material within the core region 121, followed by stabilization at a reduced fission power level but the same molten salt 10 temperature. Thus, the inherent self-regulating characteristic of a molten salt reactor 120 tends to keep its temperature constant regardless of power demand.

Not shown in FIG. 1, some electric power produced by the generator 160 must be fed back with a controller 180 to operate: (a) the energetic neutron source 111, (b) the molten salt circulating pump 140, (c) the intermediate fluid pump 161, and (d) other conventional auxiliary molten salt reactor support systems (not shown), including electrical heaters and dump tank pumps.

The temperature at which a molten salt reactor stabilizes is not constant but instead varies with its excess reactivity, which in turn depends on its concentration of fissile atoms and its concentration of neutron-absorbing species, in particular of certain fission products such as xenon-135. It also depends on control rod position (not depicted in FIG. 1). In a conventional MSR, neutron-absorbing control rods can be initially inserted into the molten salt, then gradually withdrawn as the fissile inventory and thus the excess reactivity are reduced by cumulative fission. Here, the control rods' motion has the effect of maintaining the natural stabilization temperature of the molten salt in its inherent load-following behavior at a constant value, but that effect only lasts until the control rods reach their fully withdrawn positions as the initial excess reactivity disappears. Although fertile material is converted to fissile material within a MSR by neutron absorptions followed in some cases by beta decays, for Conversion Rate (CR) values less than one these only slow but do not prevent the net consumption of fissile isotopes. The constant-temperature behavior can be extended, in principle indefinitely, by continuously removing neutron-absorbing fission product "ash" from the molten salt while also adding fresh fissile material to the molten salt at rates compensating for the fission rate. However, most available actinides are not fissile so this scheme would require isotopic enrichment and would not fully utilize the energy potentially available in natural actinides that are not fissile.

In embodiments of the HMSR, additional net conversion of fertile actinide isotopes to fissile isotopes is provided by an energetic neutron source (111 in FIG. 1), which may be either an accelerator-driven spallation neutron source or a deuterium-tritium (DT) fusion neutron source. For example, using the previously described eutectic mixture of fluorides consistent with the FIG. 1 embodiment, neutronics simulations show that an 80 cm thick molten salt blanket surrounding the neutron source is almost as effective as an infinitely thick blanket. This is because more than 99% of total neutrons are absorbed within a 80 cm thick blanket, where the total includes the 14 MeV source neutrons, fission daughter neutrons produced in the blanket, and (n,2n) neutrons produced in the blanket. For such a 80 cm thick blanket holding this mixture of fluoride salts with the actinide component predominately uranium-238, simulations show that each incoming 14 MeV neutron results in 0.413 fissions in the blanket, mostly of uranium-238, releasing 1.483 fission daughter neutrons thus averaging about 3.6 daughter neutrons per fission. Additionally about 0.243 more neutrons per 14 MeV neutron are released by (n,2n) reactions. About 2.28 neutrons per incoming 14 MeV neutron are absorbed in uranium-238, producing 2.28 atoms of uranium-239 which after two beta decay steps becomes 2.29 fissile plutonium-239 atoms. If the molten salt reactor 120 exhibits a Conversion Ratio of between CR=0.90 and CR=0.95 then the quantity of fissile material exported from the blanket per DT neutron is effectively multiplied by a conversion factor ranging between 10 and 20, while being fissioned. Thus, the number of fertile atoms converted to fissile atoms and fissioned as a result of a single 14 MeV neutron and the action of the HMSR system is in the range from 22.8 to 45.6. In terms of energy released, each single 14 MeV energetic neutron irradiating the blanket of tanks surrounding the Energetic neutron source leads to about 83 MeV of additional fission energy being released immediately in that blanket plus eventually another 4560 MeV to 9120 MeV in the molten salt reactor from fissions of initially non-fissile actinides. Thus in a HMSR the power carried by neutrons in the energetic neutron source can be a small fraction of the total plant power released by fissioning initially non-fissile actinides, i.e., less than one percent.

In embodiments with neither fission product removal nor actinide addition implemented, the HMSR's energetic neutron irradiation of the molten salt still provides the benefit of extending operating period durations between refueling outages by increasing the system's conversion from fertile to fissile actinides. With embodiments in which fission product removal and fertile actinide addition are both effective enough to continually maintain MSR criticality, it becomes possible to never recycle the molten salt. The strategy then becomes to never remove actinides from the molten salt and to never remove the molten salt containing its inventory of actinides from the HMSR. Simulations show this strategy is effective in that the actinide inventory eventually stabilizes even though actinides continue to be added.

An embodiment of the HMSR would initiate operation with the particular mixture of different actinides that does not change over time, while a related feedstock of mostly or completely fertile actinides is continuously added and while fission power is produced and converted into electricity. An attractive aspect of this embodiment is that simulations show that such stationary mixtures have all fissile components of the molten salt denatured by larger concentrations of non-fissile isotopes of the same elements. For instance, such a stationary mixture of plutonium isotopes produced from uranium is 60% non-fissile plutonium-242, 21% non-fissile plutonium-240, and 1% non-fissile plutonium-238, with only 12% as fissile plutonium-239 and 6% as fissile plutonium 241. This denatured situation reduces weapons proliferation risks since a difficult isotopic separation step would be required to create purified fissile material from this mixture.

The strategy of never removing actinides from the molten salt can be extended to also not remove certain long-lived fission products from the molten salt. However, a difficulty arises because the choice to not remove a fission product applies to all isotopes of an element. This is because it is not expected to be economic to treat different isotopes of a fission product element differently from each other. Simulations show that this non-removal strategy is quite successful for long-lived fission product isotopes of cesium, iodine and technetium. For some other long-lived fission products this strategy fails due to the unending build-up of stable fission product isotopes of the same elements. For these elements a different strategy of removal at an optimized rate could still provide the benefit of somewhat reducing the quantity of long-lived isotopes that would either need disposal in a geological repository or isotopic separation followed by transmutation.

The maintenance of MSR criticality requires that the conversion of fertile to fissile isotopes effected by the energetic neutron source must occur at a rate which, on average, counterbalances the consumption by fission of fissile isotopes. This balance is accomplished by a control system whose commands modulate the rate of production of the energetic neutrons. Such modulation does not need to be continuous, and may even be accomplished by repetitively switching the neutron source off thus producing zero neutrons and then on at a maximum neutron production rate, while adjusting the timing of those switching transitions. Feedback measurements needed to implement this control system include molten salt temperatures and flow rates, neutron flux in the MSR, and MSR control rod positions. Other measurements may also be included if found useful.

If an embodiment's energetic neutron source is based on DT fusion rather than spallation, then it is also necessary for the system to breed tritium which is accomplished by using a molten salt recipe that includes lithium having an isotopic composition ratio, lithium-6 to lithium-7, chosen to cause the needed amount of tritium production. Although in a pure DT fusion system the requirement of breeding one replacement tritium atom for each DT fusion neutron released is anticipated to be a difficult constraint to be met through neutron-consuming reactions with lithium, the situation is different in a hybrid where fission further multiplies the neutrons. In the HMSR configuration, most of the needed tritium breeding would occur in the MSR where low energy neutrons are plentiful. The minimum amount of tritium production occurs if the lithium used is pure lithium-7, in which case only high energy neutrons participate. As the lithium-6 concentration is increased, tritium production monotonically increases. Tritium is recovered from the molten salt along with other hydrogen isotopes such as protium which is sometimes injected to reduce the content of a halogen species such as fluorine for redox control, then is separated by conventional means such as cryogenic distillation. Since hydrogen isotopes diffuse through hot metal walls, it is important to forecast tritium leakage as part of the design. If leakage is excessive, it may be necessary to use double walled containment with helium circulating between the walls, undergoing continuous chemical scrubbing to keep its tritium partial pressure low.

The physics advantages of using a high energy neutron source include the ability to fission any actinide, fissile or not, and its larger yield of daughter neutrons which can cause transmutation of fertile actinides to fissile actinides. The energetic neutrons from the external source carrying 14.1 MeV or more energy per neutron can cause fission of any actinide nucleus that they strike, and when such fissions caused by such high energy neutrons occur, the number of fission daughter neutrons produced per fission is significantly greater than the number of daughter neutrons produced by fissions caused by lower energy neutrons. If each such daughter neutron is absorbed by a fertile actinide atomic nucleus in the molten salt, that nucleus is either converted immediately into a fissile actinide or it starts a decay process which after some days have elapsed converts it into a fissile nuclide. In either case, the nuclide remains in solution within the HMSR's molten salt, cycling back and forth between the critical MSR and the external neutron source.

When the MSR eventually fissions the new fissile actinide atoms created by the nuclear processes initiated by neutron irradiation of a blanket tank, some of the daughter neutrons released by those fissions are absorbed within the MSR region, also by fertile actinide isotopes dissolved in the molten salt, producing an additional fraction, (CR), of the fissile atoms from the blanket tank. Those are also converted to fissile species and fissioned, releasing yet more daughter neutrons, producing an additional fraction, $(CR)^2$ of those fissile atoms. Those in turn produce an additional fraction, $(CR)^3$ which in turn produce yet another fraction $(CR)^4$. This thus forms an infinite series of recursive logical steps represented by a geometric series. This geometric series is equivalent to multiplying the externally caused production of fissile species in the blanket of tanks by the factor, $1/(1-CR)$, where CR is the conversion ratio of the critical reactor. For instance, a graphite-moderated MSR with a conversion ratio of $CR=0.95$ provides a 20-fold increase in the effectiveness of the external neutron source in exploiting the more abundant actinide isotopes.

Fission cross sections of fissile atoms are very much larger for slow neutrons than for neutrons at the higher energies at which daughter neutrons resulting from fission are born. Neutrons slow down, i.e., are moderated, through scattering collisions with atomic nuclei. The use of a special moderator material in a critical reactor configuration can therefore allow the reactor to be smaller or to incorporate less fissile material than is possible without a moderator. Thus, most critical reactor designs include moderators, but some do not. On the other hand, materials also absorb neutrons, a behavior that is undesired in a moderator. For example, because of its hydrogen content water is an excellent moderator which facilitates physically small reactor designs. However, it absorbs so many neutrons that reactor designs using water as a moderator cannot sustain a critical chain reaction using natural uranium, instead requiring uranium enriched in its fissile isotope. Heavy water incorporating deuterium as a moderator is somewhat less effective so requires a larger moderator volume but its lower neutron absorption allows critical reactor designs using natural uranium. Other compounds incorporating deuterium may function similarly, e.g., lithium hydride using the deuterium isotope of hydrogen and lithium enriched in the lithium-7 isotope. Pure graphite, which has been used as a moderator in MSRs, requires even more volume to slow neutrons but similarly absorbs few neutrons so has been used to moderate reactors fueled with natural uranium.

Without the past six decades of research, there would be no fusion neutron sources, the spallation neutron sources would be embryonic, and there would be no MSR operating experience nor even a data base of molten salt properties. Most important for modern nuclear engineering is the vast information content of Evaluated Nuclear Data Files (ENDF), which can be used with suitable neutronics computer codes to design and evaluate nuclear energy systems without actually constructing and experimentally operating them. The use of such codes and ENDF or similar nuclear data files is essential to predicting the interplay of neutron elastic and inelastic scattering, absorption, fissions, fission daughter neutrons, (n,2n) and higher neutron releasing reactions.

Although multiple molten salt formulations are possible and may have significant advantages, a particular example starting recipe for an embodiment of the HMSR based on fluorides is the eutectic mixture of about 44.5 mole % LiF, 24.1 mole % NaF, and 31.4 mole % of fluorides of actinides such as $ThF_4$ or $UF_4$. Stated in atom % units these are equivalent to about 66 atom % fluorine, 15 atom % lithium, 11 atom % actinides and 8 atom % sodium. Stated in mass % (or weight %) these are equivalent to about 62 mass % actinides, 31 mass % fluorine, 5 mass % sodium and 2 mass % lithium. This particular mixture recipe melts uniformly at a temperature below 500° C. and remains a liquid at temperatures well above 1000° C. Importantly, the special metal alloy, Hastelloy-N, developed for its long-term high-temperature chemical compatibility with fluoride-based molten salts in the MSRE radiation environment, is usable for steady molten salt temperatures up to 706° C. with brief excursions to higher temperatures. Thus, with this particular embodiment's molten salt recipe and with existing metallic alloy materials, it is feasible to operate a thermal conversion cycle for electricity production within a temperature range between the mixture's freezing/melting point temperature and the temperature rating of existing compatible materials, e.g., 600° C. to 700° C. Alternatively, if and when graphite container materials become available, the operating molten salt temperature of a different embodiment can be elevated above 1000° C. Such high temperatures would allow electricity generation at higher efficiency and lower cost and may also make new applications practical such as the production of hydrogen fuel from water.

Neutronics simulations of neutron irradiation of this particular molten salt recipe using uranium-238 and lithium-7 show that blanket tanks with a molten salt thickness of 80 cm are able to absorb over 99% of neutrons including together the 14 MeV source neutrons, the fission daughter neutrons, and neutrons produced by other reactions such as (n,2n), (n,3n), etc. Thus, in a commercial HMSR the neutron source blanket tanks would not need to be thicker than 80 cm and may have somewhat less thickness if design optimization finds that advantageous. Simulated fission power in these subcritical blanket tanks was found to be between five and six times the DT fusion power. This is less than the factor of ten predicted in historical FFH studies, but those studies did not include fluorine, sodium and lithium, which provide as their main benefit fuel mobility.

Neutronics simulations of an embodiment of the entire HMSR system predict that the ratio of MSR power to energetic neutron source power exceeds one hundred. This result was robust; the neutron source power was less than 1% of overall HMSR plant power regardless of whether the actinide fuel feedstock was uranium-238, thorium-232, depleted uranium, or the mix of actinides found in LWR spent fuel rods. This result implies that a certain level of energy inefficiency in the neutron source can be tolerated in an economically successful HMSR system. For instance, if 30% of HMSR plant power were thermally converted at 33% efficiency to electricity and fed back to operate a neutron source which itself is only 10% efficient, the resulting energetic neutrons comprising 1% of output power would suffice to maintain fissile fuel for 100% of output power of which 70% could be converted to yield 23% of output power as electricity for sale.

An embodiment of the HMSR confers additional benefits if fission products are continuously removed from the molten salt fast enough that criticality is maintained. Chemical engineering technology is able to separate any chemicals. At issue is whether separation processes which are both economical and compatible with continuing MSR operations can be developed for all fission products. If so then it will never be necessary to shut down for "ash removal" and the molten salt can be used indefinitely without being removed. The resulting new embodiment leaves actinides dissolved in the molten salt until they fission and provides no systems for actinide removal. This HMSR embodiment was simulated in neutronics and transmutation codes; they predict that actinide inventories eventually stabilize while fresh actinides continue to be added and fission products without actinides are actively removed. Thus, this embodiment makes it possible to entirely remove actinides with their long radioactive half-lives from the waste stream while harvesting 100% of their fission energy.

Embodiments of the HMSR also mitigate proliferation concerns associated with the LWRs fuel cycle. HMSR fuel needs no enrichment, no fabrication and no reprocessing. In its best-practice implementation where the HMSR operates without interruption, interest by proliferators in its waste stream would be greatly reduced by the complete absence of any actinides there. An HMSR neither imports nor exports enriched fissile fuel, and it consumes its fissile fuel internally as fast as the fissile fuel is created, thus maintaining its low inventory. There would be no reason for an HMSR to have equipment on hand to remove any dissolved actinides, fissile or not. Additionally, simulations show that HMSR inventories evolve towards states where each fissile isotope is denatured by non-fissile isotopes of the same element, thus making futile their diversion for explosive weapons uses without additional isotopic enrichment.

HMSR simulations also showed that some long-lived fission products can be internally transmuted so that, like actinides, they also are absent from the HMSR waste stream. Thus, embodiments of the HMSR can greatly reduce the need for long term radioactive waste storage in a geological repository.

HMSR Nuclear Process Analyses

It is conventional practice in modern nuclear engineering to use computer-based modeling to the extent feasible. Similar to trends in other engineering disciplines, this alternative to the construction, operation, data measurement, acquisition and interpretation of physical experiments minimizes potential costs and risks, especially during technical development. Most significant nuclear reactions have by now been extensively studied. Committees reviewing published reaction rate measurements have periodically chosen consensus models for Evaluated Nuclear Data File (ENDF) cross section libraries. These ENDF database libraries, available from the National Nuclear Data Center at Brookhaven National Laboratory, can accurately predict most nuclear reaction rates in a real physical system if used with an appropriate nuclear computer code and system model. Many such nuclear codes exist for different applications, most developed at national laboratories of the US Government's Department of Energy.

A computer study was done to establish how well a particular embodiment of the HMSR would perform in consuming all supplied actinides if neutron losses were realistically minimized. It is summarized here in order to assist persons skilled in the art to use this invention without undue experimentation. The system of nuclear codes known as SCALE developed at Oak Ridge National Laboratory (ORNL) was used. ORNL's reference for the SCALE code package used is as follows:

Scale: A Comprehensive Modeling and Simulation Suite for Nuclear Safety Analysis and Design. Version 6.1, June 2011. ORNL/TM-2005/39. Available from Radiation Safety Information Computational Center at Oak Ridge National Laboratory as CCC-785.

Modules from the SCALE 6.1 system of codes were used along with the 238-group ENDF/B-VII Release 0 cross section library. It was necessary to develop additional interfacing code modules since the HMSR system with its two distinct nuclear reaction zones does not conform to any conventional configurations for which SCALE analyses have been automated.

The Energetic Neutron Source was modeled as an isotropic uniform density volumetric spherical source of 3.5 m radius emitting neutrons in group 4 which runs from 13.84 MeV to 14.55 MeV.

To guarantee ample moderation the MSR's graphite was modeled as a matrix of vertically oriented 15 cm/side prismatic hexagonal blocks with 3.5 cm diameter central molten salt channels. Overall cylindrical MSR size was set to 8.8 m for both diameter and height. Although larger than typical modern power reactors this is similar to the size of the graphite moderated reactors which operated at Hanford during the 1940s.

The molten salt mixtures modeled were 44.5 mole % lithium fluoride (LiF), 24.1 mole % sodium fluoride (NaF) and 31.4 mole % total (HM)Fx where HM (Heavy Metal) represents actinide species and x ranges from 4 for thorium through uranium to 3 for plutonium and higher.

Initial computer runs were made using SCALE's XSDRNPM code module in order to choose the thickness of the molten salt blanket surrounding the source. It was decided this should be functionally equivalent in terms of leakage to an infinite thickness. The goal was set that neutron leakage be between 0.5% and 1.0% of the total of (1) the energetic source neutrons plus (2) the net additional neutrons produced within the blanket by (n,2n) or (n,3n) reactions or by fission. With the molten salt actinide content set to be entirely uranium-238, an 80 cm thickness yielded the required leakage. This blanket thickness was adopted for all models.

Predicted neutron reactions in this molten salt blanket carrying uranium-238 are summarized in Table 1. For each energetic source neutron, 0.21872 fissions of uranum-238 occur releasing about 43 MeV of fission energy plus (0.82170−0.21872=0.60298) additional daughter neutrons beyond those consumed to initiate the fissions. There are also additional neutrons released by (n,2n) and (n,3n) reactions, totaling
0.00557+0.02632+0.00197+0.12613+2*(0.03793)=0.23585.
Of the net total 1.83883 neutrons, 1.66253 are captured by other uranium-238 nuclides converting them into uranium-239 which beta decays into fissile plutonium-239.

TABLE 1

Calculated Neutron Reactions in 80 cm Thick Blanket Containing U238 as Sole Actinide

| Nuclide in Molten Salt | Reaction | Reactions per 14.1 MeV source neutron |
|---|---|---|
| lithium-7 | (n, 2n) | 0.00557 |
| | (n, 3n) | 0 |
| | (n, γ) | 0.00067 |
| fluorine-19 | (n, 2n) | 0.02632 |
| | (n, 3n) | 0 |
| | (n, γ) | 0.00918 |
| sodium-23 | (n, 2n) | 0.00197 |
| | (n, 3n) | 0 |
| | (n, γ) | 0.01053 |
| uranium-238 | (n, 2n) | 0.12613 |
| | (n, 3n) | 0.03793 |
| | fissions | 0.21872 |
| | fission daughters | 0.82170 |
| | (n, γ) | 1.66253 |

The ORIGEN module of SCALE6.1 was then used in subsequent runs to simulate evolution of the molten salt's isotope inventory caused by reactions both in the MSR and in the blanket. ORIGEN's inputs include single-group collapsed cross sections, neutron flux, exposure duration, steady continuous removal rates (sec-1) for each element, and continuous addition rates for a set of fueling isotopes. Simulated powers of the MSR vs. the neutron source were adjusted to maintain keff=1 criticality using the facts that non-breeding MSR operation depletes fissile inventories, while operation of the energetic neutron source increases fissile inventories. For this adjustment, a software feedback loop functioning as a switching controller first evaluated keff criticality for the MSR based on the molten salt's most recent evolved isotope inventory, then either ran ORIGEN for the blanket if keff<1 or for the MSR if keff≥1. Over successive loop iterations the average power ratio adjusted itself to maintain keff near unity. The energetic neutron source power was separately adjusted to maintain average wall loading at 0.5 MW/m² DT fusion power equivalent.

Since all actinides have energy to be harvested through fission and if not fissioned have long half-lives requiring long term isolation, the overall objective was to find steady-state operating conditions with no actinides ever removed. These consist of steady power levels, continuous removal rates (sec$^{-1}$) for fission/transmutation products, steady continuous addition rates for actinide fueling isotopes, and an associated steady inventory of isotopes in the molten salt consistent with keff=1 criticality of the MSR. Simulations were run until averaged changes in the molten salt's isotope inventory became negligible, signaling steady-state conditions. Actinide removal rates were held at zero, thus requiring that actinides go in but never come out.

Eight different cases were run resulting in different final simulated values for total fission product inventories and for fission to energetic neutron power ratios. In cases 1 through 6, the initial actinide inventories and the continuously added actinides were entirely uranium-238. In Case 7 they were a typical spent nuclear fuel mixture from light water reactors and in Case 8 they were thorium-232. Case 1 suppressed fission product (FP) generation, equivalent to infinite FP removal rates. Case 2 assigned arbitrary removal rates to each FP element. Case 3 reduced removal rates by a factor of ten while Case 4 increased them by a factor of 10. It is significant that although Cases 2-4 varied FP removal rates by a factor of 100, they converged to steady solutions in which all actinides were fully consumed.

Having shown the HMSR can consume all actinides, attention in Case 5 turned to other components of the radioactive waste stream. Table 2 lists the longest half-life radioactive fission product isotopes sorted by their half-lives. Its point is that there are only a few radioactive FP isotopes with half-lives so long that they present a challenging long term waste disposal problem similar to unfissioned actinides.

TABLE 2

Radioactive Fission Products Sorted by Half-Life

| seq | Z | A | Symbol | Name | Half-Life | Fission Yield %* | steady inventory per annual fission rate |
|---|---|---|---|---|---|---|---|
| 1 | 53 | 129 | $^{129}$I | iodine-129 | 15.7 million yrs | 0.8 | 1.81E+05 |
| 2 | 46 | 107 | $^{107}$Pd | palladium-107 | 6.5 million yrs | 1.2 | 1.13E+05 |
| 3 | 55 | 135 | $^{135}$Cs | cesium-135 | 2.3 million yrs | 6.9 | 2.29E+05 |
| 4 | 40 | 93 | $^{93}$Zr | zirconium-93 | 1.53 million yrs | 5.5 | 1.21E+05 |
| 5 | 34 | 79 | $^{79}$Se | selenium-79 | 327 thousand yrs | 0.04 | 1.89E+02 |
| 6 | 50 | 126 | $^{126}$Sn | tin-126 | 230 thousand yrs | 0.1 | 3.32E+01 |
| 7 | 43 | 99 | $^{99}$Tc | technetium-99 | 211 thousand yrs | 6.1 | 1.86E+04 |
| 8 | 62 | 151 | $^{151}$Sm | samarium-151 | 90 yrs | 0.5 | 6.49E−01 |
| 9 | 50 | 121 | $^{121m}$Sn | tin-121m | 43.9 yrs | 0.00005 | 3.17E−05 |
| 10 | 55 | 137 | $^{137}$Cs | cesium-137 | 30.2 yrs | 6.3 | 2.79E+00 |
| 11 | 38 | 90 | $^{90}$Sr | strontium-90 | 28.9 yrs | 4.5 | 1.88E+00 |
| 12 | 48 | 113 | $^{113m}$Cd | cadmium-113m | 14.1 yrs | 0.0008 | 1.63E−04 |
| 13 | 1 | 3 | $^{3}$H | tritium | 12.32 yrs | 0.02 | 3.55E−03 |
| 14 | 36 | 85 | $^{85}$Kr | krypton-85 | 10.76 yrs | 0.2 | 3.10E−02 |
| 15 | 63 | 155 | $^{155}$Eu | europium-155 | 4.76 yrs | 0.08 | 5.49E−03 |
| 16 | 61 | 147 | $^{147}$Pm | promethium-147 | 2.62 yrs | 2.25 | 8.50E−02 |
| 17 | 55 | 134 | $^{134}$Cs | cesium-134 | 2.07 yrs | 0.0008 | 2.39E−05 |
| 18 | 44 | 106 | $^{106}$Ru | ruthenium-106 | 1.02 yrs | 0.40 | 5.89E−03 |

*Total fission yield is 200%

Case 5 attempted to apply the successful actinide non-removal strategy to onerous long-lived FPs by zeroing removal rates for ten elements, i.e., iodine, palladium, cesium, zirconium, selenium, tin, technetium, samarium, strontium, and cadmium, with the objective of transmuting their long-lived radioactive isotopes into shorter lived or stable isotopes without requiring expensive isotopic separation. The resulting inventories failed to stabilize due to rapid build-up of stable non-radioactive isotopes of four of them, i.e., palladium, samarium, selenium, and especially zirconium. Case 6 returned those four elements to their Case 2 removal rates. The non-removal strategy with stable actinide inventories then obtained small Case 6 inventories for the other six FP elements not removed, i.e., iodine, cesium, tin, technetium, strontium, and cadmium, but some of their inventories, were still growing albeit very slowly due to their stable non-radioactive isotopes. A small positive removal rate may be appropriate for these.

Steady fission product inventories in Cases 1-4 and 6-7 were all less than 0.8 atom % while their ratios of fission power to energetic neutron power varied from 244 to 1053. Steady fission product inventories showed an inverse correlation with steady power ratios, but sensitivities to individual fission product isotopes would have required many more runs to determine. Case 7 simulated SNF in the initial load and in continuous fueling. Although it had a high FP inventory its high power ratio results from SNF's inclusion of some fissile material with its uranium-238. Case 8 simulated thorium-232 fueling, showing the HMSR can consume all actinides from a thorium cycle, albeit with a power ratio of only 184. Cases 1 through 4 and 6 through 8 all demonstrated stable actinide inventories and stable criticality with fresh actinides being added and no actinides ever removed. Case 5 failed to converge and was halted after its FP fraction rose above 8.62 atom %.

Table 3 lists steady isotope inventories for fueling cases with uranium-238, with SNF from light water reactors, and with thorium. It is noteworthy that these cases have low fissile concentrations and fissile isotopes are mixed with non-fissile isotopes of the same elements.

TABLE 3

Steady Isotope Inventories (atom %),

| Isotope | Case 2 (U238) | Case 7 (SNF) | Case 8 (Th232) |
|---|---|---|---|
| li7 | 15.124 | 14.958 | 14.769 |
| f19 | 65.893 | 66.434 | 66.268 |
| na23 | 8.204 | 8.084 | 8.010 |
| FPs | 0.101 | 0.739 | 0.527 |
| th230 | 0.000 | 0.000 | 0.005 |
| th232 | 0.000 | 0.000 | 10.027 |
| pa231 | 0.000 | 0.000 | 0.002 |
| pa233 | 0.000 | 0.000 | 0.002 |
| u232* | 0.000 | 0.000 | 0.006 |
| u233* | 0.000 | 0.000 | 0.208 |
| u234 | 0.000 | 0.000 | 0.101 |
| u235* | 0.000 | 0.000 | 0.009 |
| u236 | 0.005 | 0.029 | 0.053 |
| u238 | 9.789 | 8.843 | 0.002 |
| np237 | 0.002 | 0.002 | 0.003 |
| np239 | 0.000 | 0.003 | 0.000 |
| pu238 | 0.004 | 0.003 | 0.002 |
| pu239* | 0.047 | 0.042 | 0.000 |
| pu240 | 0.082 | 0.065 | 0.001 |
| pu241* | 0.025 | 0.022 | 0.000 |
| pu242 | 0.222 | 0.198 | 0.001 |
| pu244 | 0.001 | 0.001 | 0.000 |
| am241 | 0.001 | 0.000 | 0.000 |
| am243 | 0.090 | 0.084 | 0.001 |
| cm242 | 0.001 | 0.001 | 0.000 |
| cm244 | 0.178 | 0.218 | 0.001 |
| cm245* | 0.004 | 0.006 | 0.000 |
| cm246 | 0.175 | 0.209 | 0.001 |
| cm247* | 0.005 | 0.006 | 0.000 |
| cm248 | 0.047 | 0.054 | 0.000 |

*fissile isotopes

Results of this study confirm the HMSR can completely consume all supplied actinides using uranium, SNF or thorium fuels, and that the steady fission to energetic neutron power ratio is sufficiently large for the neutron source to be less than 1% of total plant power.

While this invention has been particularly shown and described with references to example embodiments thereof, it will be understood by those skilled in the art that various changes in form and details may be made therein without departing from the scope of the invention encompassed by the appended claims.

What is claimed is:

1. A hybrid molten salt reactor (HMSR) comprising:
a source of energetic neutrons, the energetic neutrons having an average energy per neutron of 14 MeV or greater;
a critical molten salt reactor comprising a reactor vessel;
a loop comprising a path in the reactor vessel and around the source of energetic neutrons; and
a molten salt comprising a dissolved mixture of salts of fissile actinides and fertile actinides, the molten salt circulating in the loop and having a sustained exothermic nuclear reaction comprising:
the fissile and fertile actinides being irradiated by the energetic neutrons when exposed to the source of energetic neutrons, the energetic neutrons inducing subcritical nuclear fission and generating daughter neutrons;
the fissile actinides undergoing critical nuclear fission when circulating through the vessel of the critical molten salt reactor and generating daughter neutrons; and
a portion of the fertile actinides capturing a portion of the daughter neutrons, the captured daughter neutrons inducing transmutation of the portion of fertile actinides into fissile actinides.

2. The hybrid molten salt reactor of claim 1, further including a blanket of tanks surrounding the source of energetic neutrons, the molten salt circulating through the blanket of tanks, a thickness and an arrangement of the blanket of tanks enabling an adequate fraction of the energetic neutrons to be absorbed in the molten salt to maintain a sufficient inventory of fissile actinides in the molten salt to maintain criticality of the critical molten salt reactor.

3. The hybrid molten salt reactor of claim 2, wherein the thickness and the arrangement of the blanket of tanks enables the molten salt to absorb a portion of the energetic neutrons and generated daughter neutrons to maintain a desired fissile inventory.

4. The hybrid molten salt reactor of claim 2, wherein the blanket of tanks is chemically and mechanically compatible with the molten salt, each tank having separate plumbing connections for liquid inflow and outflow, the separate plumbing connections enabling draining the tank based on gravity.

5. The hybrid molten salt reactor of claim 1, further including a controller adjusting an average power level of the source of energetic neutrons to maintain fission criticality in the critical molten salt reactor, the fission induced by the energetic neutrons and absorption of the resulting fission daughter neutrons by fertile actinides maintaining fissile actinides in the molten salt at a concentration necessary for fission criticality in the molten salt reactor.

6. The hybrid molten salt reactor of claim 5, further including neutron absorbing control rods adapted to be partially inserted into the molten salt reactor to reduce a stable operating temperature of the molten salt reactor and adapted to be fully inserted into the molten salt to completely halt and preclude fission chain reactions.

7. The hybrid molten salt reactor of claim 1, further including a fission product removal system enabling removal of one or more fission products from the molten salt.

8. The hybrid molten salt reactor of claim 1, further including a fuel system adding actinide salts to the molten salt at a rate which compensates for the loss by fission of the actinides previously dissolved in the molten salt.

9. The hybrid molten salt reactor of claim 8, further including a fission product removal system enabling removal of one or more fission products from the molten salt, wherein the fission product removal system removes the fission products at a rate enabling indefinitely maintained fission critically in the critical molten salt reactor.

10. The hybrid molten salt reactor of claim 9, wherein actinide fueling and fission product removal is sufficient to enable 100% fission energy utilization of the fertile actinides.

11. The hybrid molten salt reactor of claim 1, further including a pump system to pump the molten salt around the source of energetic neutrons and through the vessel of the critical molten salt reactor.

12. The hybrid molten salt reactor of claim 11, further including a heat exchanger receiving heat produced by the HMSR, wherein the pump system pumps the molten salt through the heat exchanger.

13. The hybrid molten salt reactor of claim 1, wherein the critical molten salt reactor includes a moderator.

14. The hybrid molten salt reactor of claim 13, wherein the moderator is lithium hydride using the deuterium isotope of hydrogen and using lithium enriched in the lithium-7 isotope.

15. The hybrid molten salt reactor of claim 13, wherein the moderator is a graphite core.

16. The hybrid molten salt reactor of claim 1, wherein the molten salt contains lithium fluoride enriched in the lithium-7 isotope and sodium fluoride.

17. The hybrid molten salt reactor of claim 1, wherein the molten salt contains fertile thorium-232 and the daughter neutrons transmute the fertile thorium-232 into fissile uranium-233.

18. The hybrid molten salt reactor of claim 1, wherein the molten salt contains fertile uranium-238 and the daughter neutrons transmute the fertile uranium-238 into fissile plutonium-239.

19. The hybrid molten salt reactor of claim 1, wherein the source of energetic neutrons is a nuclear fusion device producing the energetic neutrons from the fusion of hydrogen isotopes and the hybrid molten salt reactor breeds tritium using a molten salt recipe that includes lithium having an isotopic composition ratio, lithium-6 to lithium-7, chosen to cause tritium production.

20. The hybrid molten salt reactor of claim 1, wherein the source of energetic neutrons is a spallation device producing the energetic neutrons by impacting energetic ions on a target material.

21. The hybrid molten salt reactor of claim 1, wherein the molten salt contains a mixture of one or more actinides from spent nuclear fuel wastes of one or more nuclear fission reactors, wherein absorption of neutrons either produced as fission daughters or resulting from (n,2n) and/or (n,3n) reactions fissions fissile actinides and converts fertile actinides into fissile actinides which then fission.

22. The hybrid molten salt reactor of claim 1, wherein the molten salt contains natural mined uranium which has not been isotopically enriched, the natural mined uranium containing fertile uranium-238 and fissile uranium-235, the fission daughter neutrons transmuting the fertile uranium-238 into fissile plutonium-239 and the fissile plutonium-239 undergoing fission with the uranium-235.

23. A method for integrating a source of energetic neutrons with a critical molten salt reactor, the energetic neutrons having an average energy per neutron of 14 MeV or greater, the method comprising:
circulating a molten salt containing dissolved actinide salts through a core region of the critical molten salt reactor and around the source of energetic neutrons;
irradiating the circulating molten salt with energetic neutrons, the energetic neutrons transmuting fertile actinides to fissile actinides in the molten salt;
heating the circulating molten salt with fission in the core region of the critical molten salt reactor; and
feedback controlling an output of the source of energetic neutrons to be a fraction of a total output power and modulating that fraction to increase or decrease a fissile inventory of the molten salt and resulting keff criticality eigenvalue.

24. The method of claim 23, wherein circulating the molten salt around the source of energetic neutrons includes circulating the molten salt through a blanket of tanks surrounding the source of energetic neutrons.

25. The method of claim 23, wherein circulating the molten salt further includes circulating the molten salt through an external heat exchanger, the external heat exchanger cooling the molten salt by transferring heat to an intermediate fluid loop.

26. The method of claim 23, wherein circulating the molten salt further includes using heat in the intermediate fluid loop for electricity production.

27. The method of claim 23, further including:
compensating for the loss by fission of the actinides previously dissolved in the molten salt by adding a mixture of new actinide salts to the circulating molten salt.

28. The method of claim 27, further including:
maintaining criticality by removing fission product ash from the molten salt at a given rate, the given rate limiting fission product ash inventories in the molten salt.

29. The method of claim 28, further including:
eliminating actinides from a waste stream; and
stabilizing actinide inventories in the molten salt.

30. The method of claim 29, wherein fission energy utilization of actinides in the molten salt is 100 percent.

31. The method of claim 28, wherein the given removal rate of fission product ash enhances transmutation within the molten salt of long-lived radioactive isotopes into short-lived or stable isotopes and minimizes long-lived radioactivity in a waste stream without interrupting criticality of the critical molten salt reactor.

* * * * *